United States Patent [19]

Yokokawa et al.

[11] 4,330,797
[45] May 18, 1982

[54] VIEW-FINDER FOR TELEVISION CAMERA

[75] Inventors: Sumio Yokokawa; Itsuo Takanashi; Tadayoshi Miyoshi; Shintaro Nakagaki, al of Yokohama; Koichiro Motoyama, Ninomiya; Kenichi Miyazaki, Sagamihara, all of Japan

[73] Assignee: Victor Company of Japan, Ltd., Yokohama, Japan

[21] Appl. No.: 153,937

[22] Filed: May 28, 1980

[30] Foreign Application Priority Data

May 29, 1979 [JP] Japan .................. 54-71339[U]
May 29, 1979 [JP] Japan .................. 54-71340

[51] Int. Cl.³ .............................. H04N 5/30
[52] U.S. Cl. .................. 358/224; 358/226; 313/365
[58] Field of Search .......... 358/224, 217, 225, 226, 358/229; 313/365, 371

[56] References Cited

U.S. PATENT DOCUMENTS 3,130,267 4/1964 Engler ................. 358/224
3,833,758 9/1974 Ferrari ................. 359/224
4,237,492 12/1980 Roth et al. ............. 358/226

Primary Examiner—Robert L. Richardson
Assistant Examiner—Edward L. Coles
Attorney, Agent, or Firm—Michael N. Meller; Anthony H. Handal

[57] ABSTRACT

A view-finder is used for a television camera which has an image pick-up device for picking up an image of an object responsive to incident light from the object. The television camera comprises an optical system for diverging a part of a light advancing from the object to the image pick-up device. The view-finder comprises a monochrome television picture receiving device which is supplied with an output signal of the image pick-up device and displays a monochrome picture image, and an optical system for composing the picture image of the monochrome television picture receiving device and an optical color image formed by the light diverged by the diverging optical system to form an optical image to be observed.

9 Claims, 9 Drawing Figures

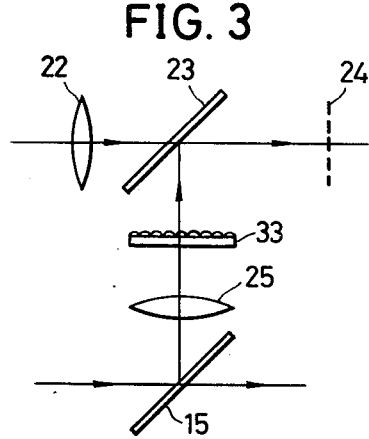
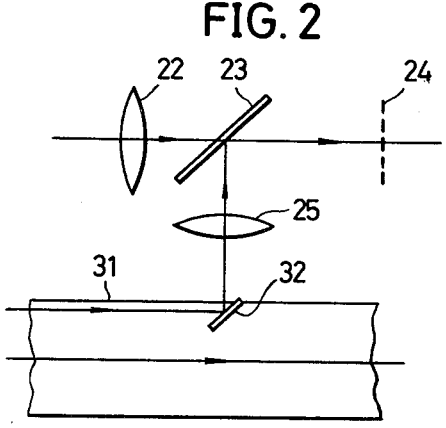
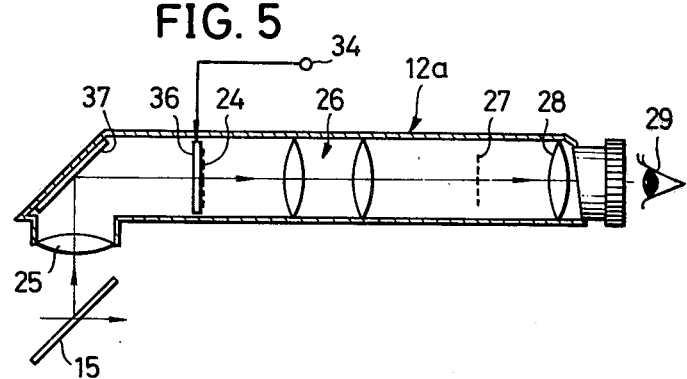
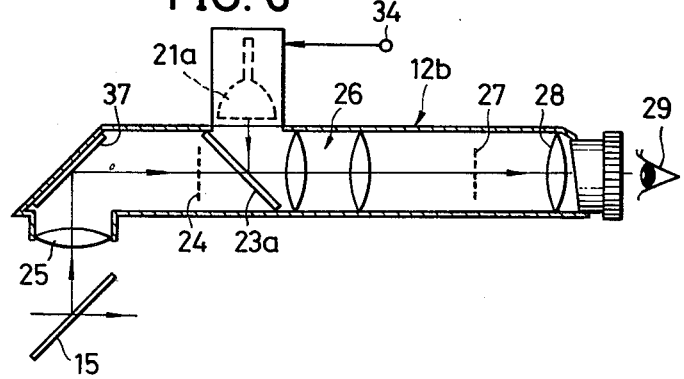

VIEW-FINDER FOR TELEVISION CAMERA

BACKGROUND OF THE INVENTION

The present invention relates generally to view-finders for television cameras, and more particularly to a view-finder in which an optical black and white or monochrome image from a monochrome image picture receiving device is superimposed thereon an optical color image made by light diverged from a light path from an object to be image-picked up to an image pick-up device in a television camera. The composite image formed by the superimposed images is observed in a view-finder by an operator in operating the television camera.

When the operator picks up images by means of a television camera, he usually uses the view-finder of the television camera in order to adjust the focus of the lens of the television camera and to decide the angle of view or view angle of the television camera.

Conventional known view-finders include electronic type view-finders and optical type view-finders.

The known electronic type view-finder has a Braun tube or cathode-ray tube (hereinafter referred to as a CRT) provided in the view-finder housing. The CRT is supplied with an output signal of an image pick-up tube of the television camera. The operator of the television camera adjusts the focus and decides the view angle of the television camera as he observes the picture screen of the CRT in the view-finder.

In this known electronic type view-finder, the sharpness of the edges of the image is improved by supplying the output video signal from the image pick-up tube to an aperture correction circuit (where the output signal is processed electrically. Accordingly, the operator can adjust the focus easily and precisely as he observes the picture screen in the view-finder. Besides, when the output video signal of the image pick-up tube is supplied to a magnetic video signal recording and/or reproducing apparatus (so-called video tape recorder. It is referred to as a VTR hereinafter.) and recorded on a magnetic tape therein, the CRT of the view-finder may be supplied with a video signal sent back from the VTR. In this case, the CRT of the viewfinder is used as a monitor television picture receiver for the VTR, since the operator of the television camera and VTR can recognize the recording condition of the VTR as he observes the received picture image.

However, when a color CRT is employed instead of the monochrome CRT, the electronic type view-finder disadvantages inevitably gives rise to such as which increase in manufacturing cost of the view-finder, increase in electric power consumption, and increase in weight of the view-finder. Accordingly, especially in a portable or simple type television camera, when the cost, electric power consumption and weight factors are taken into consideration, the monochrome CRT should be used for the CRT of the view-finder even in a color television camera.

When the operator adjusts and decides the view angle of the color television camera for the object to be image-picked up, he adjusts the direction of the television camera and the state of zooming of the zoom lens thereof taking the color of the object into consideration. At that time, it is therefore difficult for him to decide the view angle, since the image in the view-finder is not color but monochrome. More exactly, since he can not recognize the color of the object from the monochrome image picture in the view-finder, he has to take his eye off the view-finder and then to turn his eyes to the real object to recognize the color thereof and decide the approximate view angle. Thereafter, he observes the monochrome picture screen in the view-finder. He repeats the above operations and decides the view angle. Accordingly, the operation for deciding the view angle is very troublesome.

On the other hand, the known optical type view-finder is so designed that a light diverged from a light path from an afocal lens system to an image pick-up tube is introduced into the view-finder. The operator of the television camera observes the optical image formed by focusing the diverged light by lenses.

The known optical type view-finder has an advantage in that the operator can easily decide the view angle of the television camera as he observes the color image picture in the view-finder. Since the optical type view-finder does not employ a CRT, it has further advantages in that electric power is not used and the view-finder is light in weight.

However, the optical type view-finder has a disadvantage in that the operator can not adjust precisely the focus of the televison camera, since the image in the view-finder is an optical one and therefore his eyes focus naturally—that is, unconsciously. There have been optical type view-finders in which the optical image is projected onto a frosted glass or prism plate. The operator observes the projected image through a lens. In this case, his unconscious adjusting of focus is prevented. However, in this view-finder the image is dark, so it is difficult for the operator to adjust the focus precisely. Anyway, the optical type view-finder has the disadvantage that it is difficult to adjust the focus precisely. Furthermore, since the optical type view-finder has no CRT, it is impossible to monitor the video signal from the VTR.

SUMMARY OF THE INVENTION

Accordingly, it is a general object of the present invention to provide a new and useful view-finder for a television camera without the above described disadvantages of the known electronic type and optical type view-finders.

Another and specific object of the invention is to provide a view-finder for a television camera in which a composite image is formed by superimposing an optical color image on an image of a monochrome CRT. The composite image is viewed by the operator of the television camera. With the view-finder of this invention, he sees a substantial color image and therefore can easily and precisely decide the view angle and adjust the focus of the television camera, although the view-finder employs the monochrome CRT.

Other objects and further features of the present invention will be apparent from the following detailed description with respect to preferred embodiments of the invention when read in conjunction with the accompanying drawings.

BRIEF DESCRIPTION OF THE DRAWINGS

FIGS. 2, 3, 4, 5, and 6 are respectively schematic optical diagrams of essential parts of second, third, fourth, fifth, and sixth embodiments of the view-finder for a television camera of the invention;

DETAILED DESCRIPTION OF THE INVENTION

Figure 1:
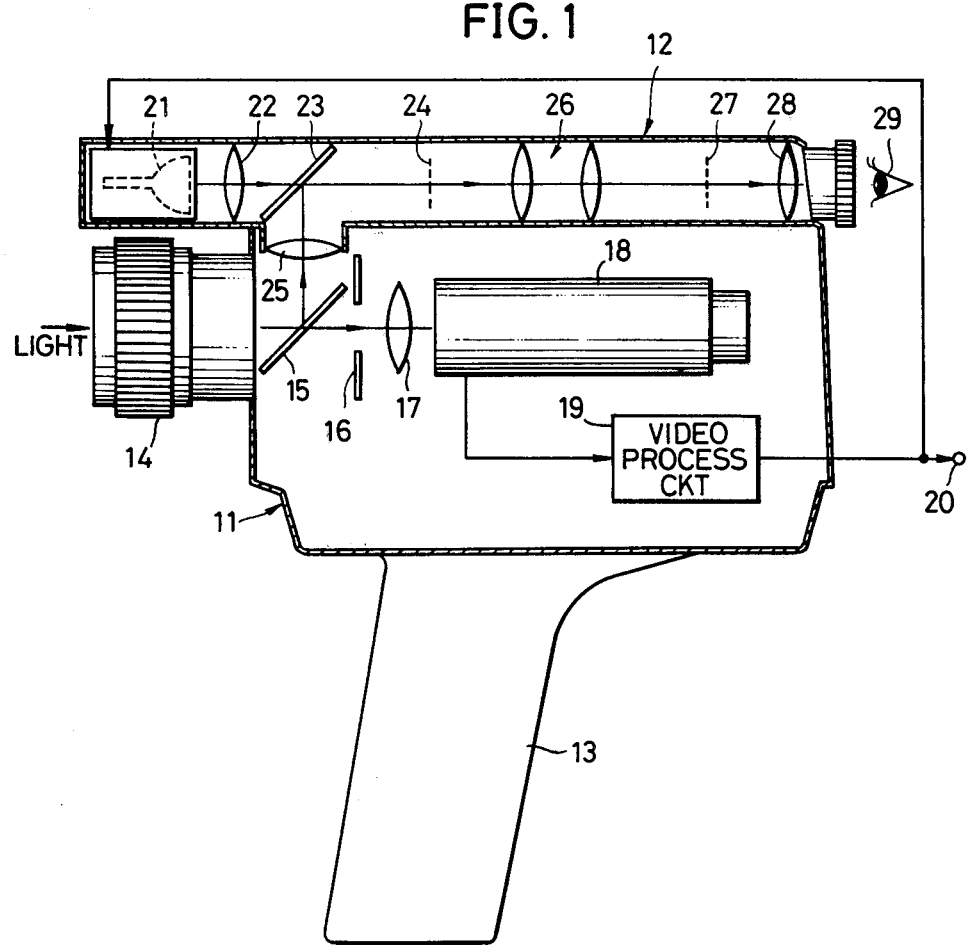
FIG. 1 is a schematic diagram of an optical system and an electrical system of an embodiment of a television camera provided with a first embodiment of the view-finder of the present invention.

Referring first to FIG. 1, a view-finder part 12 is provided unitarily with a television camera unit 11 on the upper part thereof. A grip 13 is fixed to the lower surface of the television camera unit. Incident light from an object (not shown) passes through an afocal lens system 14 and enters into the television camera unit 11. This light passes through a half-mirror (a prism may be substituted therefor) 15, an iris 16, and a master lens system 17 and is focused on a photo-conductive surface (photoelectric surface) of an image pick-up tube 18.

An output signal (a video signal) of the image pick-up tube 18 is supplied to a video signal processing circuit 19 and processed into a composite video signal in a well-known manner. The resulting composite video signal is derived from a terminal 20 and supplied to a VTR (not shown), for example. The output composite video signal is also supplied to a black and white or monochrome CRT 21 provided in the view-finder part 12 and reproduced as an image on a picture screen thereof. The image on the picture screen of the CRT 21 is focused at a position 24 by a lens 22 through a half-mirror (or a prism) 23.

On the other hand, a part of a flux of the light passed through the afocal lens system 14 is reflected by the half-mirror 15 and is diverged from the light flux. The reflected and diverged light is focused at the position 24 by a lens 25 after being reflected by a half-mirror 23. Accordingly, a quasi-color image which is substantially regarded as an optical color image is focused at the position 24. In this quasi-color image, the color image formed by the light diverged by the half-mirror 15 is superimposed on the monochrome image of the CRT 21.

The quasi-color image at the position 24 is focused at a position 27 by a relay lens system 26. An eye 29 of an operator of the television camera observes the image at the position 27 through an eye lens 28. In this instance, since the operator observes the color image, he can decide easily the view angle of the television camera taking the color of the object into consideration as he looks in the view-finder. Besides, since the view-finder part 12 has the CRT 21, he can adjust easily and precisely the focus of the lenses of the television camera. Further, the CRT 21 may be utilized as a monitor receiver, though it is a monochrome one, when the signal sent from the VTR is supplied to the CRT 21.

The position of the half-mirror (or prism) 15 is not limited to the position shown in FIG. 1 but may be between the iris 16 and the master lens sytem 17 or between the master lens system 17 and the image pick-up tube 18.

Next, other embodiments of the view-finder of the invention will be described hereinafter. In those embodiments, only essential parts thereof are described and shown in the drawings and description and drawings of other parts are omitted since they are similar to the parts of the first embodiment shown in FIG. 1.

The optical color image to be superimposed on the monochrome image from the CRT 21 gives sufficient color information on tne monochrome image and is not required to have a high image resolution. In other words, no problem occurs even if the superimposed optical color image has large aberration.

Accordingly, in the embodiment shown in FIG. 2, the half-mirror 15 in the first embodiment shown in FIG. 1 is not employed. Instead of this, a small total reflection mirror 32 is provided near the peripheral part of a parallel light flux path 31 from the afocal lens system 14 to the iris 16. A part of the light in the parallel light flux path near the peripheral part thereof is reflected and diverged by the total reflection mirror 32. This diverged light is superimposed as an optical color image on the monochrome image from the CRT whereby the quasi-color image is obtained.

The contour of the optical quasi-color image to be observed by the operator is determined by the monochrome image of the CRT 21. Accordingly, the optical color image formed by the light diverged from the light flux from the afocal lens system has sufficient color information. If there is too much aberration between the superimposed monochrome image of the CRT and the color image formed by the diverged light, it is preferable that the color image formed by the diverged light have adequately blurred contours on edges. The third embodiment of the view-finder of the invention is described in conjunction with FIG. 3.

In FIG. 3, the light diverged by the half-mirror 15 from the light flux from the afocal lens system passed through the lens 25 and then passed through an optical low-pass filter 33 which consists of a lenticular lens, for example. When the diverged light passes through the optical low-pass filter 33, a high frequency component thereof is removed. The light from which the high frequency component has been removed is reflected by the half-mirror 23 and then focused at the position 24 as an optical color image. Since this optical color image is formed by the light from which the high frequency component has been removed, the contour of the optical color image is blurred adequately. Accordingly, even if there is an aberration between the monochrome image from the CRT and the optical color image formed by the diverged light, this aberration is imperceptible in the composite quasi-color image formed of the optical color image superimposed on the monochrome image.

Figure 4:
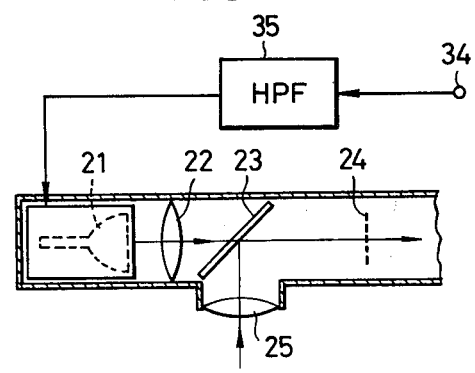

In another embodiment, as shown in FIG. 4, the signal applied to a terminal 34 from the video signal processing circuit 19 shown in FIG. 1 may be supplied through a high-pass filter 35 to the CRT 21. In this case, a low frequency component of the video signal to be supplied to the CRT 21 is removed at the high-pass filter 35. Accordingly, the picture image of the CRT 21 is an image of which contour is intensified.

A liquid crystal panel display or an EL panel display may be employed instead of the CRT 21 of FIG. 1. Further, as shown in FIG. 5, a transparent panel display 36 such as transparent liquid crystal panel or a transparent EL panel may be disposed at the position 24 in a view-finder 12a. In this embodiment, the CRT 21 and lens 22 of FIG. 1 are not used, and a total reflection mirror 37 is used instead of the half-mirror 23.

The transparent panel display 36 is supplied with the signal from the video signal processing circuit 19 through the terminal 34 and displays a monochrome picture image. The light diverged by the half-mirror 15 is focused at the position 24 and forms the optical color image thereat through the transparent panel display 36 disposed at the position 24. The color image is superimposed on the monochrome image of the panel display 36 whereby the quasi-color image is formed at the position 24. This quasi-color image is observed by the eye 29 similarly as in the first embodiment.

In the present embodiment, the panel display 36 may be disposed at the position 27 instead of the position 24.

The disposition of the CRT 21 is not limited to the first embodiment of FIG. 1. For example, as shown in FIG. 6, a CRT 21a may be disposed in a direction perpendicular to an optical axis of a view-finder 12b. The light diverged by the half-mirror 15 is reflected by the total reflection mirror 37 and its light path is changed. The monochrome image of the CRT 21a is reflected by a half-mirror 23a and passed through the lens system 26 together with the color image from the position 24. They are focused in a superimposed state at the position 27 and form the quasi-color image thereat.

In the first embodiment of FIG. 1, the view-finder part 12 is integrally provided with the television camera unit 11. However, they may have separate constructions as shown in FIG. 7.

Figure 7:
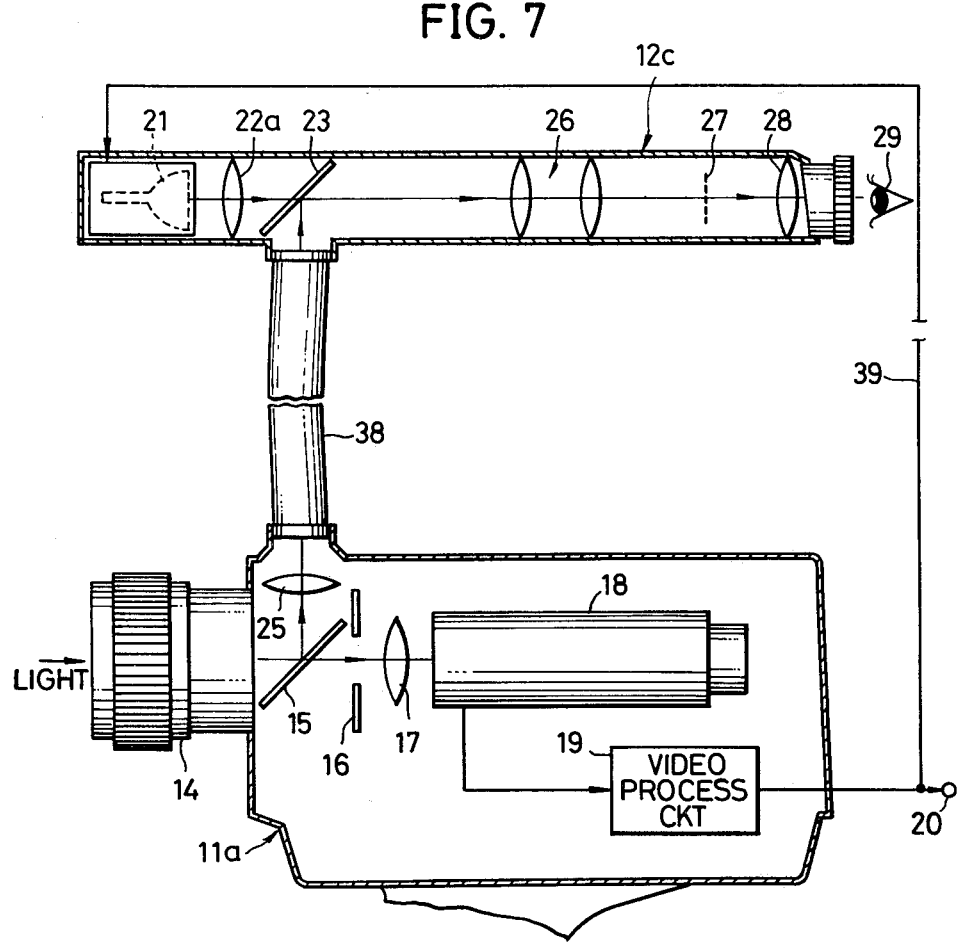
FIG. 7 is a schematic diagram of a seventh embodiment of the view-finder of the invention and a television camera cooperating therewith.

In FIG. 7, a television camera unit 11a is separated from a view-finder part 12c. They are connected by an optical fiber 38 and a wire cable 39. The light diverged by the half-mirror 15 is focused on one end face of the optical fiber 38 by the lens 25. The focused optical image is transmitted through the optical fiber 38. The transmitted optical image enters into the view-finder part 12c through the other end face of the optical fiber 38 and is reflected by the half-mirror 23. The reflected light passes through the lens system 26 and is focused at the position 27. On the other hand, the image of the CRT 21 focused by a lens 22a passes through the half-mirror 23 and is focused at the position 27 by the lens system 26. The CRT 21 is supplied with the video signal through the cable 39 from the video signal processing circuit 19 and displays the picture image.

The view-finder of the present embodiment is convenient for use when the operator of the television camera must be at a position away from the television camera unit and to observe the object to be picked up by the television camera and operate the television camera unit by remote control, for instance, in picking up images of wild animals, birds, etc.

Figure 8:
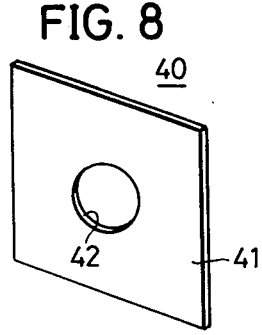
FIG. 8 is a perspective view of a mirror employed in an eighth embodiment of the view-finder of the invention.

In adjusting the focus, most operators adjust the focus of the television camera as they observe mainly a central part of the picture image in the view-finder. In this connection, a half-mirror 40 shown in FIG. 8 may be used instead of the half-mirror 23. The half-mirror 40 consists of half-mirror plate 41 provided with an opening or aperture 42 in the central part thereof.

The light diverged by the half-mirror 15 in FIG. 1 is reflected by all the half-mirror 40 except for the aperture 42. The optical color image without the central part is formed at the position 24. The light of the monochrome image of the CRT 21 passes through the half-mirror 23 and is focused at the position 24. This light passes through the aperture 42 as it is without attenuation.

The operator observed a composite image the central part which consists of the sharp monochrome image of the CRT 21 with the peripheral part consisting of the superimposed color image on the monochrome image. The operator can adjust precisely the focus of the television camera as he observes the central monochrome picture image, while he can decide the view angle of the television camera as he observes the peripheral quasi-color picture image.

As a modification of the present embodiment, a total reflection mirror consisting of a total reflection mirror plate provided with the central aperture 42 may be used instead of the half-mirror 40. In this case, the configuration of the total reflection mirror is the same as that of the half-mirror 40. The operator observes an image the central part of which consists of the monochrome image of the CRT 21 with the remaining peripheral part consisting of the optical color image formed by the light diverged by the half-mirror 15.

Figure 9:
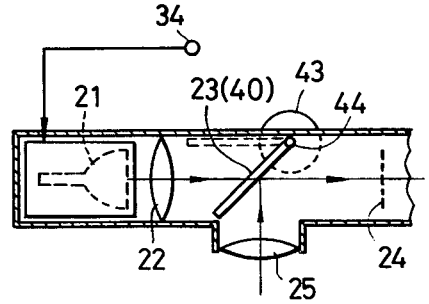
FIG. 9 is a schematic optical diagram of an essential part of a ninth embodiment of the view-finder of the invention.

In the embodiment shown in FIG. 9, a rotatable shaft 44 provided at one end of the half-mirror 23 (40) is rotated by a knob 43 fixed to the shaft 44. The half-mirror 23 (40) is rotated and shifted between positions shown in a full line and broken line in response to the rotation of the knob 43. When the half-mirror 23 (40) is shifted to the position shown in the broken line, the operator observes only a picture image from the CRT 21. The half-mirror 23 (40) is rotated to the position shown by the broken line when the operator adjusts the focus, and is rotated to the position shown in full line when the operator decides the view angle. The mirror 23 (40) may be a total reflection mirror.

In those embodiments described above, the image pick-up tube 18 in the television camera unit 11 may be of a single tube type or a plural tube type. Further an image pick-up element such as a solid-state image pick-up plate etc. may be used instead of the image pick-up tube.

The view-finder part 12 (12a, 12b) may be assembled within a camera grip or a carrying handle (not shown) provided on the television camera unit 11.

Further, this invention is not limited to these embodiments but various variations and modifications may be made without departing from the scope of the invention.

What we claim is:

1. A view-finder for a television camera having an image pick-up means for picking up an image of an object responsive to incident light from the object, said television camera comprising
   a lens system through which the incident light from the object advances to the image pick-up means and means for diverging a part of a light advancing through the lens system,
   said view-finder comprising: a monochrome television picture receiving means which is supplied with an output signal of the image pick-up means and displays a monochrome picture image; and means for composing the picture image of the monochrome television picture receiving means and an optical color image formed by the light diverged by the diverging means to form an optical image to be observed.

2. A view-finder for a television camera as claimed in claim 1 in which: the monochrome television picture receiving means consists of a monochrome Braun or cathode ray tube; the picture image composing means comprises means for focusing a monochrome image of the monochrome cathode ray tube at a predetermined position, means for focusing an optical color image by the diverged light at said predetermined position to be superimposed on the monochrome image, and means for submitting the superimposed image to an operator's observation.

3. A view-finder for a television camera as claimed in claim 1 in which the diverging means consists of a half-mirror or prism which is provided transversally in a path of the light advancing from the object to the image pick-up means and diverges a part of the light over total light flux.

4. A view-finder for a television camera as claimed in claim 1 in which the diverging means consists of a total reflection mirror which is provided near the peripheral part within the light flux advancing from the object to the image pick-up means and diverges only one portion of said light flux.

5. A view-finder for a television camera as claimed in claim 1 in which the image composing means further comprises an optical low-pass filter for removing a high frequency component of the diverged light.

6. A view-finder for a television camera as claimed in claim 1 which further comprises a high-pass filter for removing a low frequency component of the output signal of the image pick-up means and supplying the remaining signal from which the low frequency component has been removed to the monochrome television picture receiving means.

7. A view-finder for a television camera having an image pick-up means for picking up an image of an object responsive to incident light from the object, said television camera comprising means for diverging a part of a light advancing from the object to the image pick-up means,
said view-finder comprising: a monochrome television picture receiving means which is supplied with an output signal of the image pick-up means and displays a monochrome picture image; and means for composing the picture image of the monochrome television picture receiving means and an optical color image formed by the light diverged by the diverging means to form an optical image to be observed, said monochrome television picture receiving means consisting of a transparent monochrome television picture receiving panel display disposed at a predetermined position, said image composing means comprising means for focusing an optical color image at the predetermined position responsive to the diverged light, and means for submitting the image superimposed at the predetermined position to an operator's observation.

8. A view-finder for a television camera having an image pick-up means for picking up an image of an object responsive to incident light from the object, said television camera comprising means for diverging a part of a light advancing from the object to the image pick-up means, said view finder having a construction separate from the television camera, and comprising: a monochrome television picture receiving means which is supplied with an output signal of the image pick-up means and displays a monochrome picture image; means for composing the picture image of the monochrome television picture receiving means and an optical color image formed by the light diverged by the diverging means to form an optical image to be observed; and an optical fiber for transmitting the light diverged by the diverging means to the image composing means within the view-finder.

9. A view-finder for a television camera having an image pick-up means for picking up an image of an object responsive to incident light from the object, said television camera comprising means for diverging a part of a light advancing from the object to the image pick-up means,
said view-finder comprising: a monochrome television picture receiving means which is supplied with an output signal of the image pick-up means and displays a monochrome picture image; and means for composing the picture image of the monochrome television picture receiving means and an optical color image formed by the light diverged by the diverging means to form an optical image to be observed, said image composing means further comprising a mirror for changing the direction of the light path of the light diverged by the diverging means, and said mirror being provided with an aperture in the central part thereof for passing a part of the light from the picture image of the monochrome television picture receiving means.

* * * * *